United States Patent
Lawrence

(10) Patent No.: US 11,421,449 B2
(45) Date of Patent: Aug. 23, 2022

(54) LATCH AND CATCH ASSEMBLY

(71) Applicant: B/E Aerospace, Inc., Winston-Salem, NC (US)

(72) Inventor: Robert J. Lawrence, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 613 days.

(21) Appl. No.: 16/419,073

(22) Filed: May 22, 2019

(65) Prior Publication Data
US 2020/0370341 A1    Nov. 26, 2020

(51) Int. Cl.
| | |
|---|---|
| *E05B 65/52* | (2006.01) |
| *E05B 5/00* | (2006.01) |
| *B64D 11/00* | (2006.01) |
| *E05C 5/00* | (2006.01) |
| *E05C 9/04* | (2006.01) |

(52) U.S. Cl.
CPC ............ *E05B 65/52* (2013.01); *E05B 5/006* (2013.01); *B64D 11/003* (2013.01); *E05C 5/00* (2013.01); *E05C 9/041* (2013.01); *Y10T 292/0805* (2015.04); *Y10T 292/0825* (2015.04); *Y10T 292/0828* (2015.04); *Y10T 292/0856* (2015.04); *Y10T 292/0862* (2015.04);
(Continued)

(58) Field of Classification Search
CPC ....... E05B 65/52; E05B 5/006; B64D 11/003; E05C 3/34; E05C 5/00; E05C 9/041; E05C 19/00; E05C 19/12; Y10T 292/0828; Y10T 292/0856; Y10T 292/0805; Y10T 292/0825; Y10T 292/0911; Y10T 292/0921; Y10T 292/0862
See application file for complete search history.

(56) References Cited

U.S. PATENT DOCUMENTS

| | | | | |
|---|---|---|---|---|
| 56,347 | A | * | 7/1866 | Beach ................. E05C 3/34 292/49 |
| 131,321 | A | * | 9/1872 | Wright ............ E05B 65/0858 292/51 |

(Continued)

FOREIGN PATENT DOCUMENTS

| | | |
|---|---|---|
| CA | 2593664 A1 | 10/2007 |
| JP | S54154997 U | 10/1979 |

OTHER PUBLICATIONS

Extended Search Report for European Application No. 19215966.3 dated Aug. 17, 2020, 6 pages.

*Primary Examiner* — Christine M Mills
*Assistant Examiner* — Faria F Ahmad
(74) *Attorney, Agent, or Firm* — Suiter Swantz pc llo

(57) ABSTRACT

A latch and catch assembly including a catch attachable to a first structure such as a door, and a latch mechanism attachable to a second structure such as a cabinet, the latch mechanism and the catch cooperating to secure the first structure relative to the second structure. The latch mechanism includes first and second hooks mounted for pivoting movement between an engagement position for engaging with the catch and a disengagement position for disengaging from the catch, a translating gear rail positioned between the first and second hooks coordinating pivoting movement of the first and second hooks, and an actuator mechanism for driving movement of the translating gear rail to drive the first and second hooks toward their disengagement position.

17 Claims, 8 Drawing Sheets

(52) U.S. Cl.
  CPC .... *Y10T 292/0911* (2015.04); *Y10T 292/0921* (2015.04); *Y10T 292/438* (2015.04)

(56) References Cited

U.S. PATENT DOCUMENTS

| | | | | |
|---|---|---|---|---|
| 324,883 A * | 8/1885 | Prindle | ............... | E05B 65/0858 292/51 |
| 335,175 A * | 2/1886 | Blathwayt | ........... | E05B 65/0858 292/51 |
| 385,904 A * | 7/1888 | Boekler | .................... | E05C 3/34 292/49 |
| 413,355 A * | 10/1889 | Watson | ..................... | E05C 3/34 292/49 |
| 1,320,444 A * | 11/1919 | Buczynski | .......... | E05B 65/0811 70/97 |
| 1,549,505 A * | 8/1925 | Rasmussen | ......... | E05B 65/0092 292/25 |
| 1,632,195 A * | 6/1927 | Rasmussen | ......... | E05B 65/5261 292/25 |
| 2,506,943 A * | 5/1950 | Shreve | ............... | E05B 65/0042 292/30 |
| 3,175,376 A * | 3/1965 | Cantwell | .............. | E05B 63/127 70/131 |
| 3,423,968 A * | 1/1969 | Foote | .................... | E05C 19/182 70/14 |
| 3,585,692 A * | 6/1971 | Le Mire | ............. | A44B 11/2534 24/635 |
| 4,738,126 A * | 4/1988 | Haberle | ................... | E05B 67/36 70/14 |
| 5,544,924 A * | 8/1996 | Paster | ................ | E05B 15/0006 160/201 |
| 6,508,494 B1 * | 1/2003 | Reuter | .................... | E05C 9/041 292/25 |
| 6,682,109 B2 * | 1/2004 | Horne | ...................... | E05C 1/10 292/22 |
| 7,040,671 B2 * | 5/2006 | Su | ...................... | E05B 63/0013 292/116 |
| 7,228,719 B2 * | 6/2007 | Alehin | ................ | E05B 65/0858 292/199 |
| 7,559,584 B2 * | 7/2009 | Rebel | .................. | E05B 63/0056 292/25 |
| 8,038,183 B2 * | 10/2011 | Atkinson | ................ | E05B 63/06 292/24 |
| 8,419,082 B2 * | 4/2013 | Wu | ........................ | G06F 1/181 292/116 |
| 9,719,278 B2 * | 8/2017 | Taylor | ................ | E05B 47/0001 |
| 2004/0245784 A1 * | 12/2004 | Tsai | .................... | E05B 65/0858 292/51 |
| 2007/0259551 A1 | 11/2007 | Rebel et al. | | |

* cited by examiner

LATCH AND CATCH ASSEMBLY

BACKGROUND

Storage bins, doors, cabinets and other stowage elements in vehicles such as aircraft require secure closure for safety purposes. Necessary equipment and passenger personal belongings are present on commercial airline flights, for example, and so storage areas are provided to both crew members and airline customers. Passengers are generally untrained as to the operation of cabin equipment. Accordingly, the equipment offered for passenger use should be conveniently and intuitively operable. Where movable items such as stowage doors and panels are present, closures should be secure to avoid both unintended opening and any rattling or other noise-producing vibrations that might contribute to any passenger perceptions of insecurity.

Airline operators prefer smooth and uncluttered cabin elements for clean aesthetic purposes. For efficiency, the secure closure of doors and panels and other movable effects should be discernible by momentary inspection as flight attendants move through a passenger cabin for preflight inspections and preparations. As both airline employees and passengers move about a cabin, the profiles of handles and levers that operate aircraft stowage equipment should be minimized to prevent such elements from jutting unnecessarily into aisles and seating areas. Overhead storage bins are of particular concern with regard both to secure closure and to minimizing the extension of handles and levers and such from stowage doors.

Accordingly, improvements are needed in latching mechanisms for automatically achieving the secure latching of stowage doors upon closure. Improvements are also needed in intuitively operable closure latches that are flush with cabin structures such as storage bin walls and doors.

SUMMARY OF THE INVENTIVE ASPECTS

To achieve the foregoing and other advantages, the inventive aspects disclosed herein are directed to a latch and catch assembly including a catch attachable to a first structure and a latch mechanism attachable to a second structure, the latch mechanism and the catch cooperating to secure the first structure relative to the second structure. The latch mechanism includes first and second hooks mounted for pivoting movement between an engagement position for engaging with the catch and a disengagement position for disengaging from the catch, a translating gear rail positioned between the first and second hooks, the translating rail engaged on opposing lateral sides thereof with the respective first and second hooks, and an actuator mechanism operable for driving movement of the translating gear rail to drive simultaneous pivoting movement of the first and second hooks in opposite directions to drive ends of the first and second hooks apart toward their disengagement position.

In some embodiments, each of the first and second hooks are rotatably mounted on a shaft coupled to a base plate, and wherein each of the first and second hooks are rotationally-biased in a direction toward their engagement position by a torsion spring mounted on the shaft and engaging the respective one of the first and second hooks.

In some embodiments, the translating gear rail is movably positioned on the base plate between the first and second hooks and has longitudinally-spaced gear teeth formed on the opposing lateral sides thereof engaging gear teeth on mounting rings of the first and second hooks, the gear teeth of the translating gear rail engaging the gear teeth of the mounting rings such that linear movement of the translating gear rail is coordinated with pivoting movement of the first and second hooks.

In some embodiments, movement of the translating gear rail in a first direction drives pivoting movement of the first and second hooks toward their disengagement position, and movement of the translating gear assembly in a second direction opposite the first direction drives the first and second hooks toward their engagement position.

In some embodiments, each of the first and second hooks includes a pivotally-attached end and a hooked end, and wherein the hooked ends are positioned spaced apart and facing each other when the first and second hooks are in their engagement position.

In some embodiments, the catch includes a strike plate positioned between first and second spaced openings, the translating gear rail adapted to contact the strike plate to move the translating gear rail away from the catch to drive the first and second hooks toward their engagement position, and the first and second hooks adapted to be received in the respective first and second openings to engage the first and second hooks with the catch in their engagement position.

In some embodiments, the latch mechanism is mountable on an interior wall of a storage bin and the catch is mountable on a door pivotally attached to the storage bin, whereby, when the first and second hooks engage the catch in their engagement position, the door is latched in a closed condition.

In some embodiments, the latch mechanism further includes a base plate and keeper attached to the base plate, the keeper maintaining persistent contact with the translating gear rail by a spring force of a clip, and the translating gear rail having ridges on an outer face thereof within which the clip engages to maintain the first and second hooks in their disengagement position.

In some embodiments, the actuator mechanism includes a user-actuatable pin for moving the translating gear rail toward the catch, thereby pivoting the first and second hooks toward their disengagement position.

In some embodiments, the actuator mechanism includes an actuatable handle, wherein pivoting the handle causes the translating gear rail to move toward the catch.

The inventive aspects disclosed herein are further directed to a cabinet assembly including a cabinet having a latch mechanism mounted on an inner wall of the cabinet and a door pivotally-attached to the cabinet and having a catch mounted on the door, wherein a portion of the latch mechanism engages with the catch to hold the door in a closed condition. The latch mechanism includes a base plate, first and second hooks mounted on shafts of the base plate for pivoting movement between an engagement position for engaging with the catch and a disengagement position for disengaging from the catch, a translating gear rail positioned between the first and second hooks, the translating rail engaged on opposing lateral sides thereof with the respective first and second hooks to coordinate translating gear rail movement with pivoting movement of the first and second hooks, and an actuator mechanism operable for driving movement of the translating gear rail to drive simultaneous pivoting movement of the first and second hooks toward their disengagement position.

In some embodiments, each of the first and second hooks are rotationally-biased in a direction toward their engagement position by a torsion spring mounted on the shaft and engaging the respective one of the first and second hooks.

In some embodiments, the translating gear rail is movably positioned on the base plate between the first and second hooks and has longitudinally-spaced gear teeth formed on the opposing lateral sides thereof engaging gear teeth on mounting rings of the first and second hooks, the gear teeth of the translating gear rail engaging the gear teeth of the mounting rings such that linear movement of the translating gear rail is coordinated with pivoting movement of the first and second hooks.

In some embodiments, movement of the translating gear rail in a first direction drives pivoting movement of the first and second hooks toward their disengagement position, and movement of the translating gear assembly in a second direction opposite the first direction drives the first and second hooks toward their engagement position.

In some embodiments, each of the first and second hooks includes a pivotally-attached end and a hooked end, and wherein the hooked ends are ramped such that engagement of the hooked ends with the catch deflects the first and second hooks toward their disengagement position.

In some embodiments, the catch includes a strike plate positioned between spaced first and second spaced openings, the translating gear rail adapted to contact the strike plate to move the translating gear rail away from the catch to drive the first and second hooks toward their engagement position, and the first and second hooks adapted to be received in the respective first and second openings to engage the first and second hooks with the catch in their engagement position.

In some embodiments, the latch mechanism further includes a keeper attached to the base plate, the keeper maintaining persistent contact with the translating gear rail by a spring force of a clip, and the translating gear rail having ridges on an outer face thereof within which the clip engages to maintain the first and second hooks in their disengagement position.

In some embodiments, the actuator mechanism includes a user-actuatable pin for moving the translating gear rail toward the catch, thereby pivoting the first and second hooks toward their disengagement position.

In some embodiments, the actuator mechanism includes an actuatable handle, wherein pivoting the handle causes the translating gear rail to move toward the catch thereby pushing the catch away from the latch mechanism and opening the door.

Inventive aspects disclosed herein are further directed to a latch and catch assembly including a catch attachable to a door, and a latch mechanism attachable to a structure to which the door is pivotally attached, the latch mechanism and the catch cooperating to secure the door in a closed condition, and the latch mechanism including first and second hooks mounted for pivoting movement between an engagement position for engaging with the catch and a disengagement position for disengaging from the catch, a translating gear rail positioned between the first and second hooks coordinating pivoting movement of the first and second hooks, and an actuator mechanism for driving movement of the translating gear rail to drive the first and second hooks toward their disengagement position.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

In various embodiments, a storage door is automatically latched upon reaching a closed position by a latch mechanism having spring-loaded geared hooks that engage a door-mounted catch. A user can lift a handle or depress a button, depending on the actuator configuration, to disengage the hooks and open the door. Actuation of the handle or depressing the button ultimately rotates the spring-loaded hooks from their engaged positions permitting the catch to swing away from the latch mechanism by opening of the door. User actuation of the handle or button linearly extends a translating gear rail engaged with the geared hooks and, by forward linear movement of the gear rail, the hooks are rotated from their extended and engaged position to withdrawn and disengaged positions. A keeper maintains the gear rail in the extended position until the catch is returned to the latch mechanism by closure of the door. Upon closure, the catch presses the gear rail rearward from the extended position, overcoming the keeper, and automatically causing the hooks to re-engage the catch.

Figure 1:
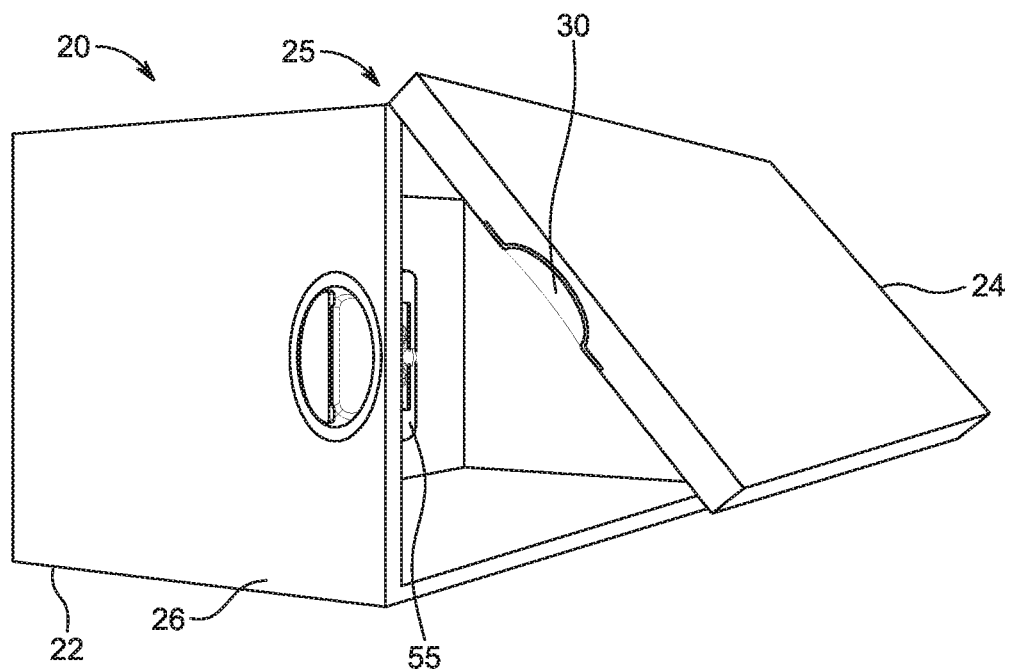
FIG. 1 is a perspective view of a storage bin having a wall-mounted latch mechanism and a door-mounted catch each according to an embodiment of the present disclosure.

A non-limiting example of a latchable storage bin 20 is shown in FIG. 1. The storage bin 20 may be fixed or mobile in a passenger or crew environment of a vehicle such as an aircraft. The storage bin 20 includes a main container 22 and a door 24 pivotally connected to the main container by a hinge 25. The storage bin 20 is illustrated as a box having a generally rectangular shape with planar walls and a rectangular planar hinged door 24 hinged at the top of the door. The storage bin 20 has an open or closed interior according to the position of the door 24 from the illustrated open position to a closed position at which the door 24 is brought in contact or at least closely proximal to the forward edges of the walls of the box.

In other embodiments, the main container 22 and door 24 can be of shaped to fit into spaces between other elements in an in-use environment. Thus, the storage container 22 can each be curved and contoured and can have tapered ends and edges. In such other embodiments the inward side of the door 24 and the outward edges of the walls of the box are sufficiently matched to bring a latch mechanism 50, illustrated as mounted in a wall 26 of the box, into engagement with a catch 30, illustrated as carried by the door 24, into engagement as the door 24 is brought to the closed position.

Two expressly illustrated embodiments of a latch mechanism 100 are shown in the drawings. In FIGS. 1-7, the latch mechanism 50 in one embodiment can be disengaged from the catch 30 by use of a user-actuatable handle 52, permitting the door 24 to open. In FIGS. 8-11, a latch mechanism in another embodiment can be disengaged from the catch 30 by use of a user-actuatable button.

Figure 2:
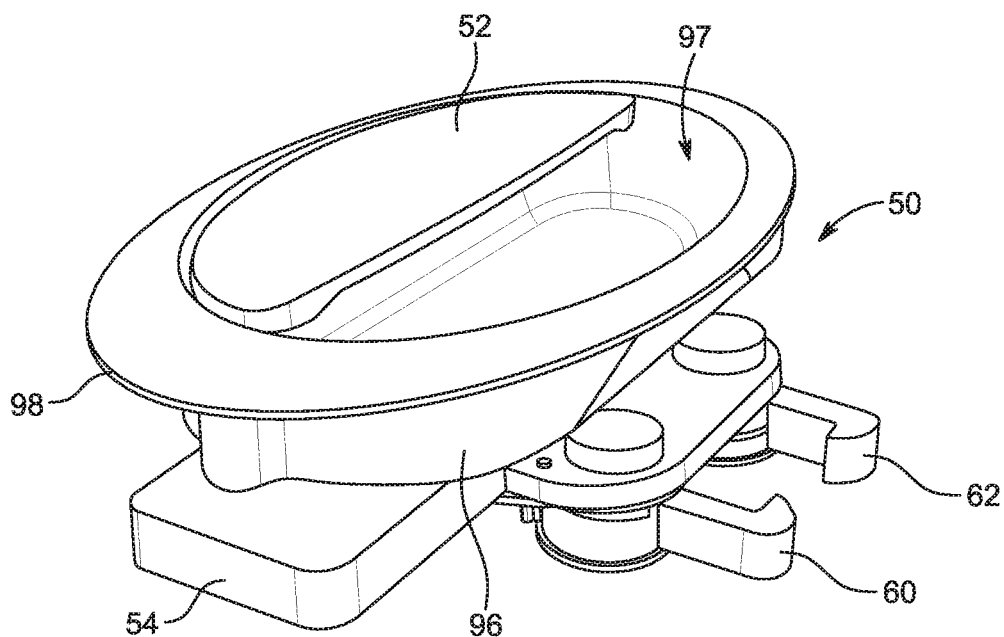
FIG. 2 is a perspective view of the latch mechanism of FIG. 1.

As shown in FIG. 2, the latch mechanism 50 of the first illustrated embodiment includes a base plate 54 upon which two hooks are pivotally mounted. Two laterally spaced axles or shafts, referenced as a first axle 56 and a second axle 58 (FIG. 5), extend parallel to each other from a first side of the base plate 54. The hooks 60 and 62, referenced as the first hook 60 and second hook 62, are pivotally mounted on the first axle 56 and second axle 58 respectively. The hooks are retained on the axles, each by a washer and a retaining ring.

Each hook has a mounting ring 64 received onto the respective axle. An arm 66 extends from a first side of the mounting ring 64 defined as the forward side when the hook is in the engagement position of FIG. 4. Each arm 66 has a hook 68 at its terminal end opposite the mounting ring 64. A second side 70 (FIG. 4) of each mounting ring 64, defined as the rearward side when the hook is in the engagement position of FIG. 4, has gear teeth such that the mounting ring 64 defines at least a partially toothed spur gear at least along the second side 70 thereof. The hooks 60 and 62 are symmetrically formed and arranged such, when the hooks 60 and 62 are pivoted by partial rotation into their engagement positions, the arms 66 extend forward and parallel to each other and the hooks 68 extend laterally into the space between the arms 66. When the hooks 60 and 62 are pivoted by partial rotation into their disengagement positions (FIG. 6), the arms 66 withdraw and extend laterally, in opposite lateral directions relative to each other, and the hooks 68 are directed forward.

Figure 4:
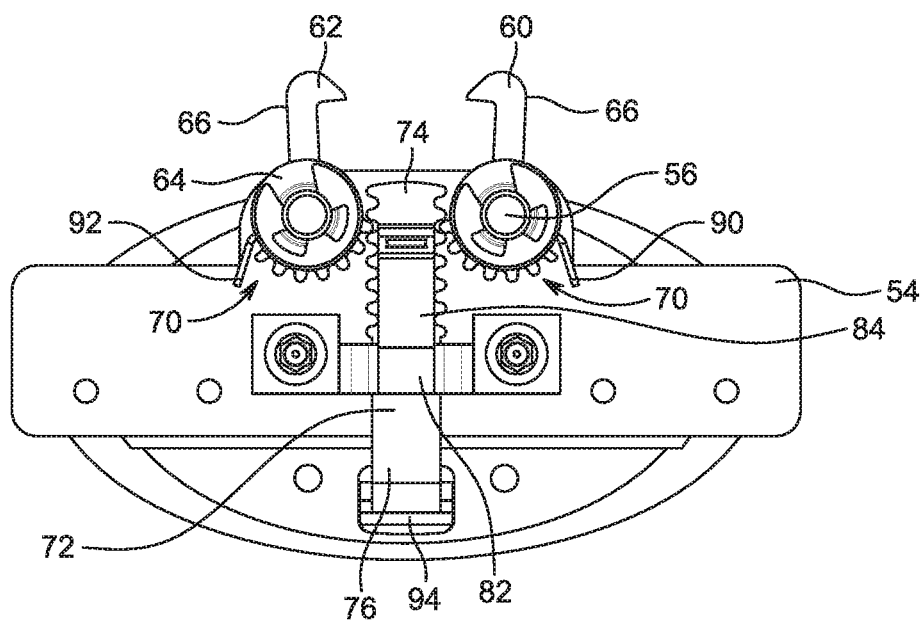
FIG. 4 is a plan view of the latch mechanism of FIG. 2 in a latched condition.
Figure 6:
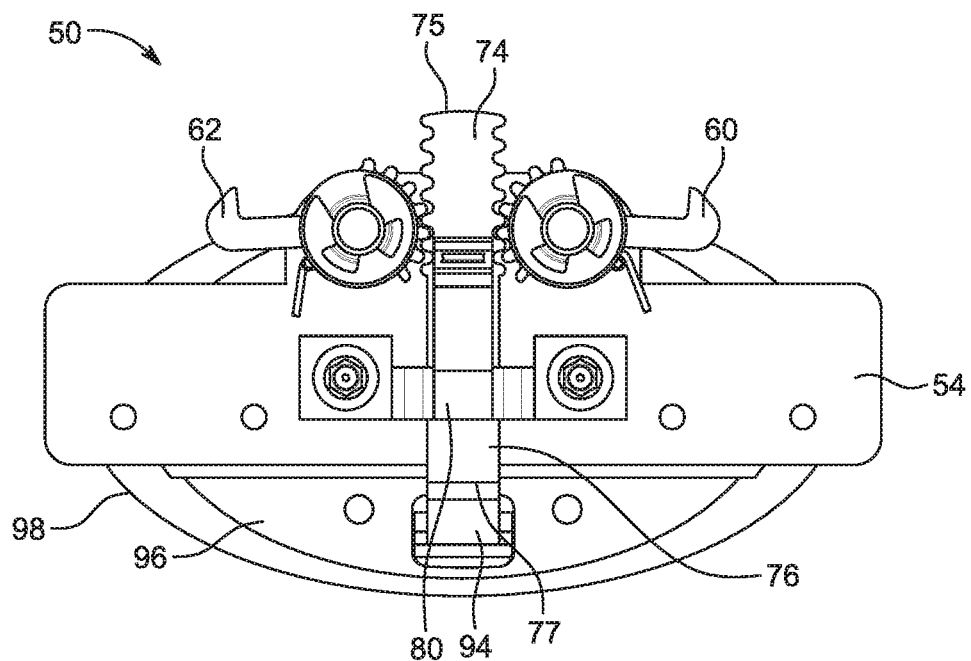
FIG. 6 is a plan view of the latch mechanism of FIG. 2 in an unlatched condition.

A gear rail 72 is movably positioned on the base plate 54 between the hooks 60 and 62, engaging the gear teeth along the second sides of the hooks 60 and 62. The gear rail 72 has a forward rail section 74 extending variably between the mounting rings 64 of the hooks 60 and 62 and a rearward rail section variably positioned relative to the base plate 54. At least the forward rail section 74, along two lateral sides thereof, has laterally extending and longitudinally spaced gear teeth. The gear teeth of the gear rail 72 engage the toothed mounting rings 64 of the hooks 60 and 62 such that forward linear movement of the gear rail 72 is coordinated with pivoting movement of the hooks 60 and 62 toward their disengagement positions (FIG. 6). Similarly, rearward linear movement of the gear rail 72 is coordinated with pivoting movement of the hooks 60 and 62 toward their engagement positions (FIG. 4). When the gear rail 72 is in a forward-most first position (FIG. 6), the hooks 60 and 62 are in their disengagement positions. Similarly, when the gear rail 72 is in a rearward-most second position (FIG. 4), the hooks 60 and 62 are in their engagement positions.

A keeper 80 maintains the gear rail 72 on the base plate 54. The keeper 80 has a bridge 82 with lateral tabs by which the keeper is bolted to the base plate 54. A clip 84 extends longitudinally forward from the bridge. A contact tip at the forward terminal end of the clip 84 extends toward the gear rail 72 and maintains persistent contact with the gear rail 72 by a spring force of the clip 84. The contact tip is illustrated as curved bend at the forward end of the clip 84. The gear rail 72 has a rearward rail section 76 extending variably between the bridge and base plate 54, with the lateral tabs of the keeper 80 adjacent opposite lateral sides of the gear rail 72.

The gear rail 72 has an outer face directed toward the keeper 80. Ridges 78 on the outer face register the gear rail 72 relative to the base plate 54 when the gear rail 72 reaches the forward position (FIG. 6) by engaging the contact tip of the keeper 80. The keeper 80 retains the gear rail 72 in the forward position, and the hooks 60 and 62 in the disengagement positions, until sufficient force is applied to the gear rail 72 to overcome the engagement of the contact tip of the keeper 80 with the ridges 78 on the outer face of the gear rail 72.

Each hook 60 and 62 is biased toward its engagement position (FIG. 4) by a respective torsion spring. A first torsion spring 90 received onto the first axle 56 has opposing ends engaging the base plate 54 and first hook 60 respectively. A second torsion spring 92 received onto the second axle 58 has opposing ends engaging the base plate 54 and second hook 62 respectively. The torsion springs apply rotational force (torque) to the respective hooks, thereby rotationally biasing the hooks 60 and 62 to the engagement positions. In the illustrated embodiment, each torsion spring (90,92) is mounted on a respective axle (56,58) and positioned between the mounting ring 64 of the corresponding hook and the base 54. As the first torsion spring 90 and second torsion spring 92 respectively bias the first hook 60 and second hook 62 toward the engagement positions, the gear rail 72 is biased toward the rearward-most second position of FIG. 4.

Figure 7:
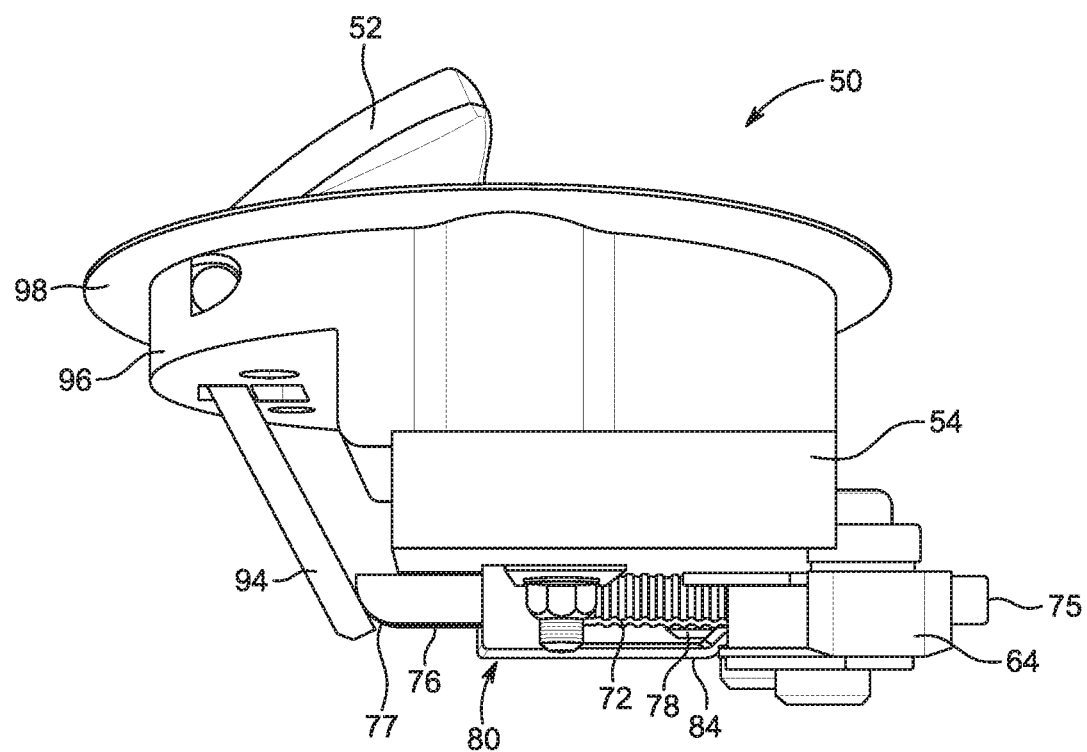
FIG. 7 is a perspective view of the latch mechanism of FIG. 2 in the unlatched condition.

For use in operating the latch mechanism 50, the user actuatable handle 52 is pivotally connected to a second side of the base plate 54, opposite the side on which the gear rail 72 is mounted. As shown in FIGS. 4-7, a lever 94 connected to the handle 52 pivots relative to the base plate 54 when the handle 52 is moved. A forward face of the lever 94 contacts the rearward end 77 of the gear rail 72. The handle 52 is pivotable relative to the base plate 54 from the position of FIGS. 2-5 to the position of FIGS. 6-7. The position of FIGS. 6-7 is termed a first position of the handle 52, and the position of FIGS. 2-5 is termed a second position, in correspondence respectively with the forward-most first position (FIG. 6) and the rearward-most second position (FIG. 4) of the gear rail 72.

Figure 5:
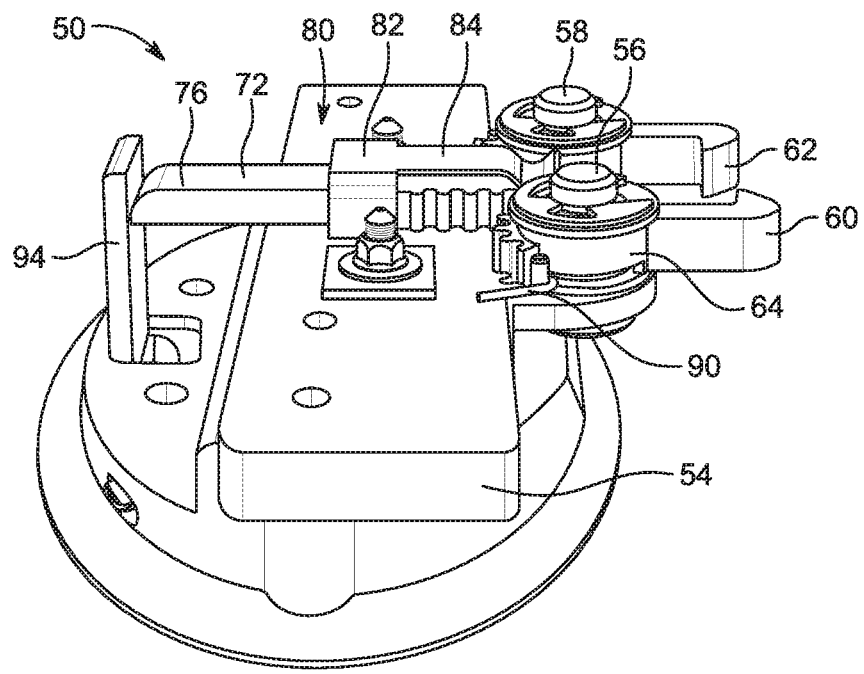
FIG. 5 is a perspective view of the latch mechanism of FIG. 2 in the latched condition.

When the handle 52 is in the second position, the lever 94 is pivoted rearward, the gear rail 72 is thereby permitted by the lever 94 to move to the rearward-most position, and the hooks 60 and 62 are accordingly in their engagement positions (FIG. 4) by engagement with the gear rail 72. When the handle 52 is in the first position, the lever 94 is pivoted forward, the gear rail 72 is pressed forward by the lever 94 to the forward-most position, and the hooks 60 and 62 are accordingly in their disengagement positions (FIG. 6) by engagement with the gear rail 72. As the first torsion spring 90 and second torsion spring 92 respectively bias the first hook 60 and second hook 62 toward the engagement positions, the gear rail 72 is biased toward the rearward-most second position of FIG. 4, thereby biasing the lever 94 rearward and the handle 52 to the second position (FIGS. 1,5).

Figure 3:
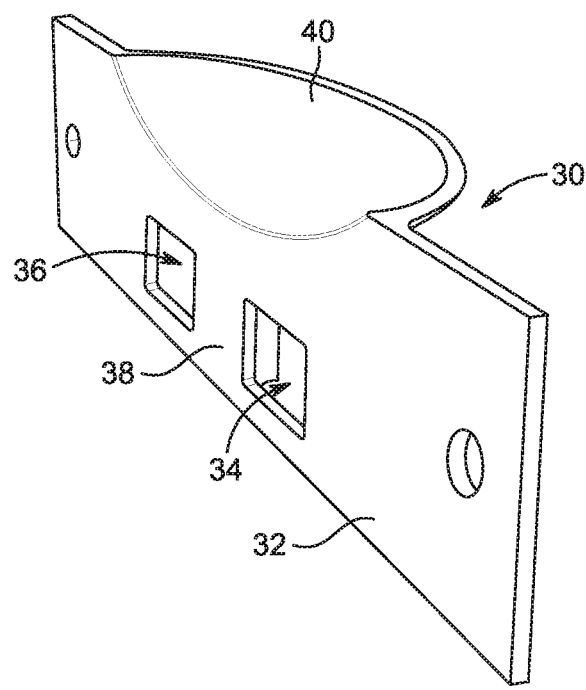
FIG. 3 is a perspective view of the catch of FIG. 1.

In the illustrated embodiment, the handle 52 is pivotally connected to the second side of the base plate 54 by way of a mounting cup 96 by which the latch mechanism 50 is mounted in the wall 26 of the storage bin 20 in FIG. 1. A flange 98 along an edge of the cup 98 engages the wall 26, with the mounting cup 96 sunken into the wall. The latch mechanism 50 is fixed to the wall by engagement of the flange 98 with an exterior side of the wall, and engagement of the flange 98 with an interior side of the wall. Interior side and exterior side refer to the interior and exterior of the storage bin 20 respectively. When the handle 52 is in the second position (FIG. 2), the handle 52 is positioned in the cup 96 with the exterior side of the handle 52 being flush or smoothly aligned with the flange 98 and wall exterior. When the handle 52 is in the first position (FIG. 4), the handle 52 is pivoted outward from the cup 96. The cup 96 defines an area greater than an area of the handle 52. Thus, the cup 96 defines an opening 97 (FIG. 2) in any position of the handle 52 to permit a user to pull the handle 52 from the second position to the first position to disengage the hooks 60 and 62 from the catch (FIG. 3).

The catch 30 includes a mounting plate 32 for attachment to any element to be engaged with the latch mechanism 50. Thus, the mounting plate 32 is attached to an edge of the door 24 in the storage bin 20 in FIG. 1. The mounting plate 32 has a first opening 34 for the first hook 60 and a second opening 36, laterally spaced from the first opening, for receiving the second hook 62. The first opening 34 and second opening 36 are dimensioned and spaced to accommodate pivoting movements of first hook 60 and second hook 62 from their engagement positions (FIG. 4) to their disengagement positions (FIG. 6). A strike portion 38 of the mounting plate between the first opening and second opening serves to engage the catch 30 with the hooks 60 and 62. When the catch 30 is brought within the effective reach of the hooks 60 and 62, for example by closure of the door 24 with respect to the main container 22 (FIG. 1), pivoting of the hooks 60 and 62 to their engagement positions (FIG. 4) captures the strike portion 38 of the mounting plate 32 between the arms 66, with the arms 66 extending through the openings 34 and 36, and with the hooks 68 preventing separation of the catch 30 from the latch mechanism 50. The catch 30 includes a dished grip 40 extending from the mounting plate 32 for use in manipulating the door 24 by hand. The dished grip 40 is sunken into an edge of the door 24 in the example of FIG. 1.

As shown in FIG. 6, when the hooks 60 and 62 are pivoted into their disengagement positions (FIG. 6), the gear rail 72 is in the forward-most position, and the forward end 75 of the gear rail 72 extends forward from the latch mechanism 50. This defines an unlatched or open condition of the latch mechanism 50. The latch mechanism 50 automatically latches when the catch is brought within the reach of the hooks 60 and 62. In the unlatched or open condition of the latch mechanism 50 (FIG. 6), the keeper 80 is engaged with the ridges 78 on the gear rail 72 thereby maintaining the hooks 60 and 62 in their disengagement positions against the biasing of the torsion springs. As the mounting plate approaches the latch mechanism 50, for example as the door 24 hinges toward the main container 22 for closure of the storage bin 20, the strike portion of the mounting plate of the catch contacts the forward end 75 of the gear rail 72 and presses the gear rail 72 rearward into the latch mechanism 50. With assistance from the biasing of the torsion springs, this overcomes the engagement of the contact tip of the keeper 80 with the ridges 78 on the gear rail 72 and automatically causes the hooks 60 and 62 to pivot toward their engagement positions (FIG. 4) by engagement with the gear rail 72. The torsion springs may cause a light snapping closure action as the gear rail 72 retracts to the rearward-most position. This defines a latched or closed condition of the latch mechanism 50 (FIG. 4), and a latched and closed condition of the door 24 and storage bin 20 when the latch mechanism 50 and catch 30 are used as in the example of FIG. 1.

Throughout transitions between engagement and disengagement of the latch mechanism 50 with the catch, the first hook 60 and second hook 62 are biased toward their engagement positions by the torsion springs 90 and 92. From the latched or closed condition of the latch mechanism 50 (FIG. 4), in which the hooks 60 and 62 are in the engagement positions and the gear rail 72 is retracted to this rearward-most position (FIGS. 2 and 4-5), the handle 52 can be pivoted outward (FIG. 7) from the cup 98 by user action such that: the lever 94 presses the gear rail 72 forward; the gear rail 72 rotates the hooks 60 and 62 to their disengagement positions (FIGS. 6-7) against the biasing force of the torsion springs; and the forward end 75 of the gear rail 72 pushes the catch away from the latch mechanism 50, opening the storage bin 20 in the in-use example of FIG. 1. In such action, the torsion springs are overcome to permit the latch mechanism 50 to assume the unlatched condition, and the keeper 80 maintains the latch mechanism 50 in the unlatched condition by engaging the ridges 78 on the outer face of the gear rail 72 once the forward most position of the gear rail 72 is reached.

The latch mechanism 50 and catch 30 provide a clean, elegant appearance for the storage bin 20 or other stowage container where used. The handle 52 is flush or smoothly aligned with the flange 98 and wall 26 of the bin 20, and the dished grip 40 is sunken into the edge of the door 24 in the example of FIG. 1. A protective housing 55 is attached to the base plate 54 opposite the mounting cup 96, encasing moving components from exposure in the interior of the storage bin 20 (FIG. 1).

Figure 8:
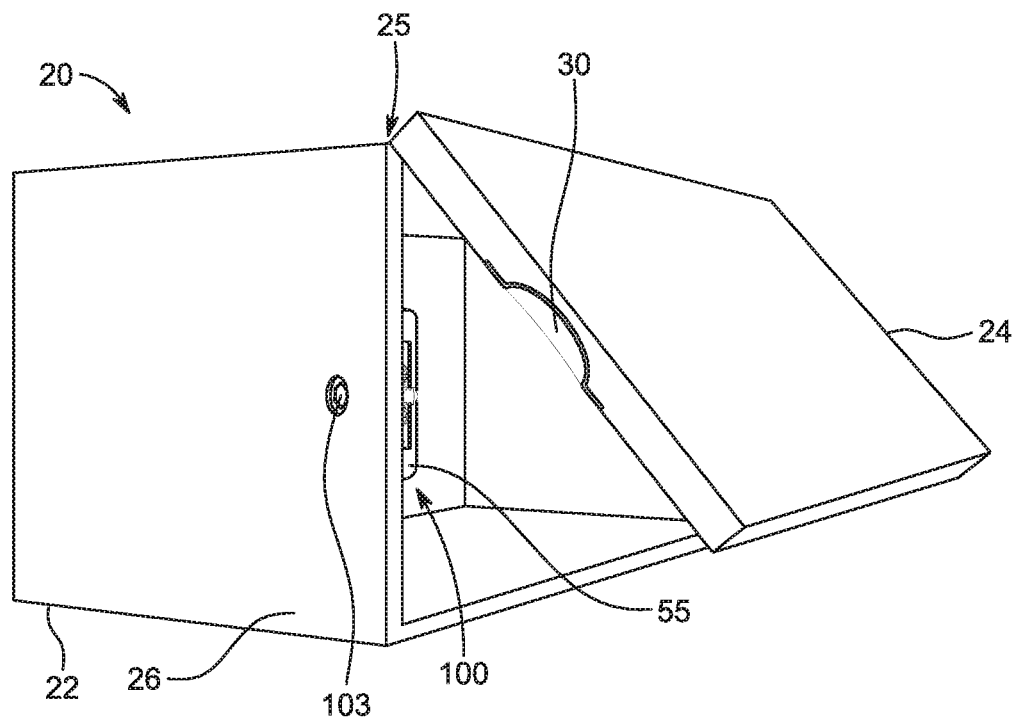
FIG. 8 is a perspective view of another storage bin having a wall-mounted latch mechanism and a door-mounted catch each according to another embodiment of the present disclosure.
Figure 9:
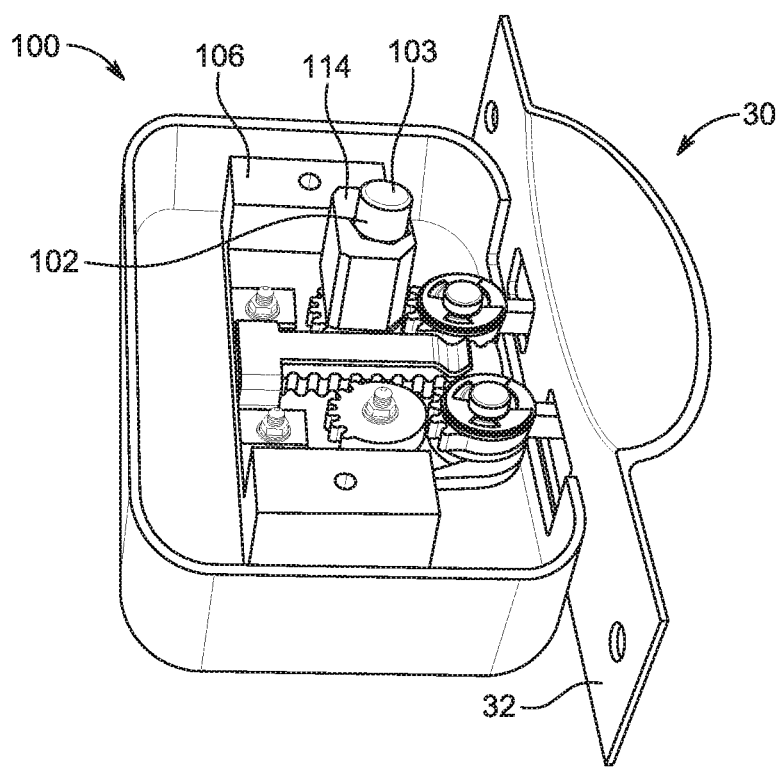
FIG. 9 is a perspective view of the latch mechanism of FIG. 8 engaged with the catch of FIG. 3.
Figure 10:
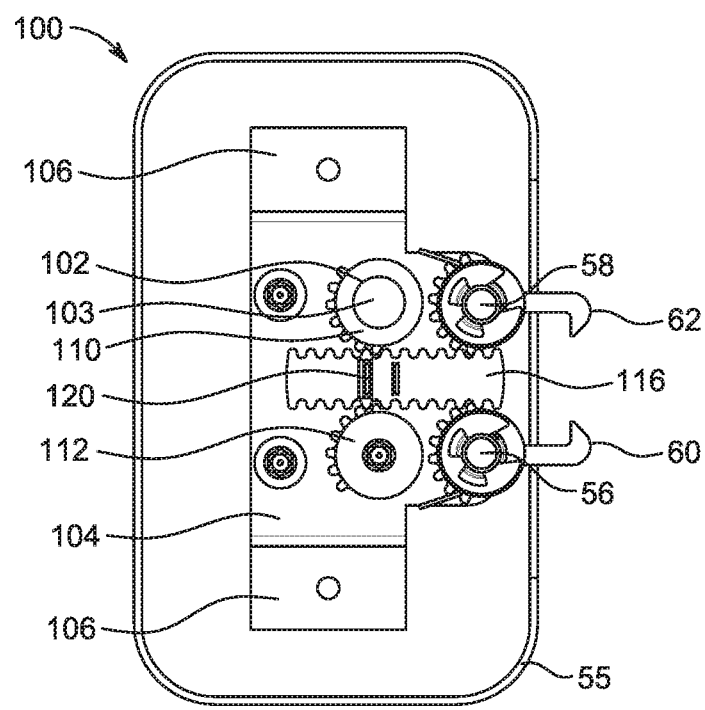
FIG. 10 is a plan view of certain components of the latch mechanism of FIG. 9 in a latched condition.
Figure 11:
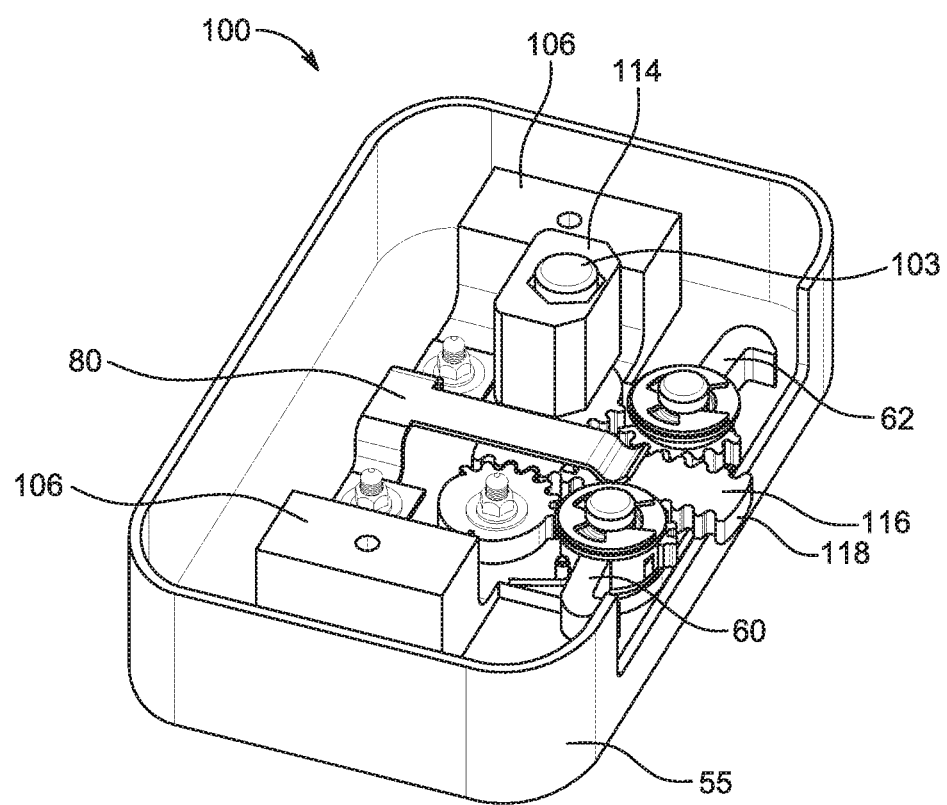
FIG. 11 is a perspective view of the latch mechanism of FIG. 9 in an unlatched condition.
Figure 12:
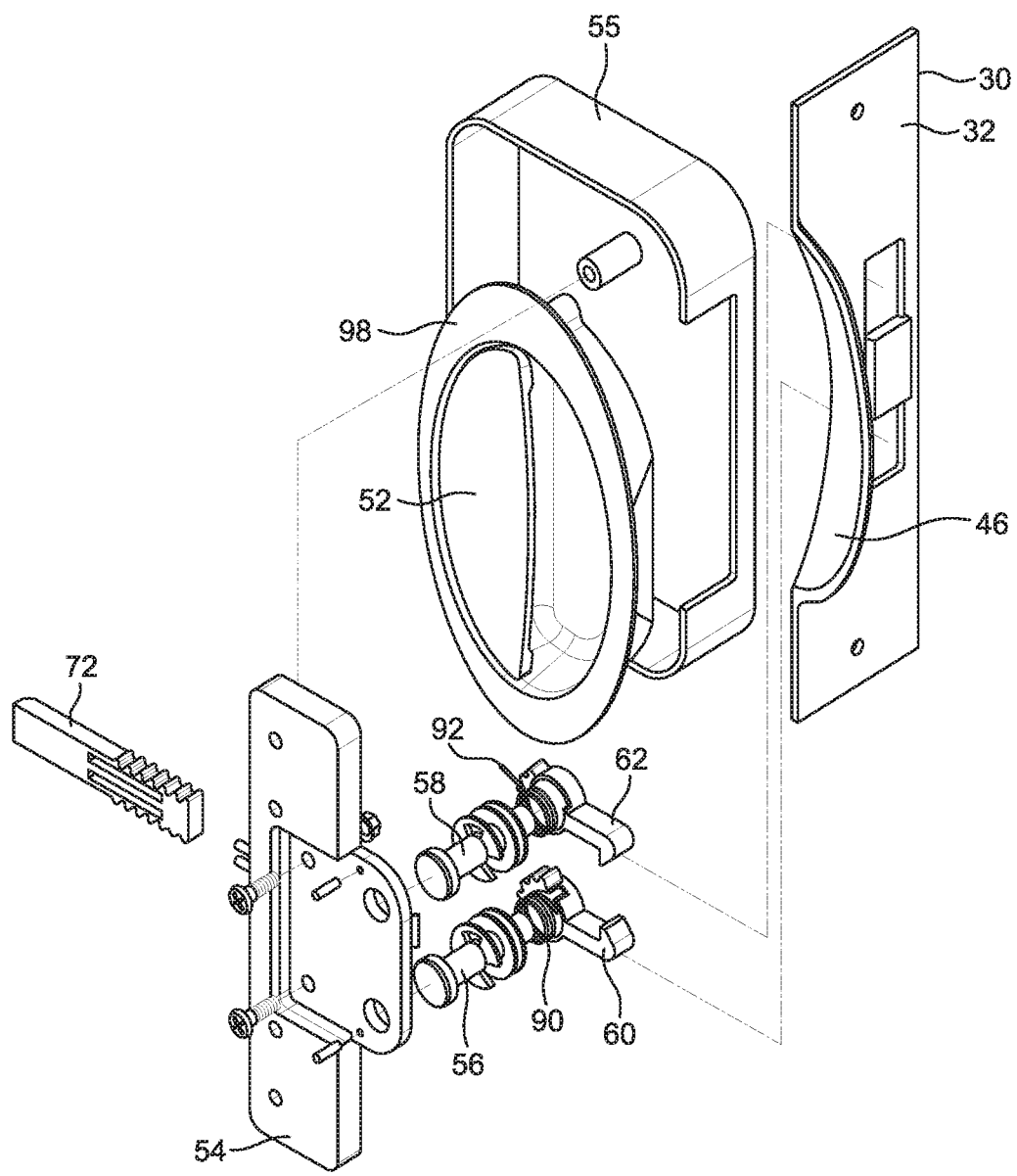
FIG. 12 is an exploded view of the latch and catch assembly according to the embodiment including a latch mechanism for latch release.
Figure 13:
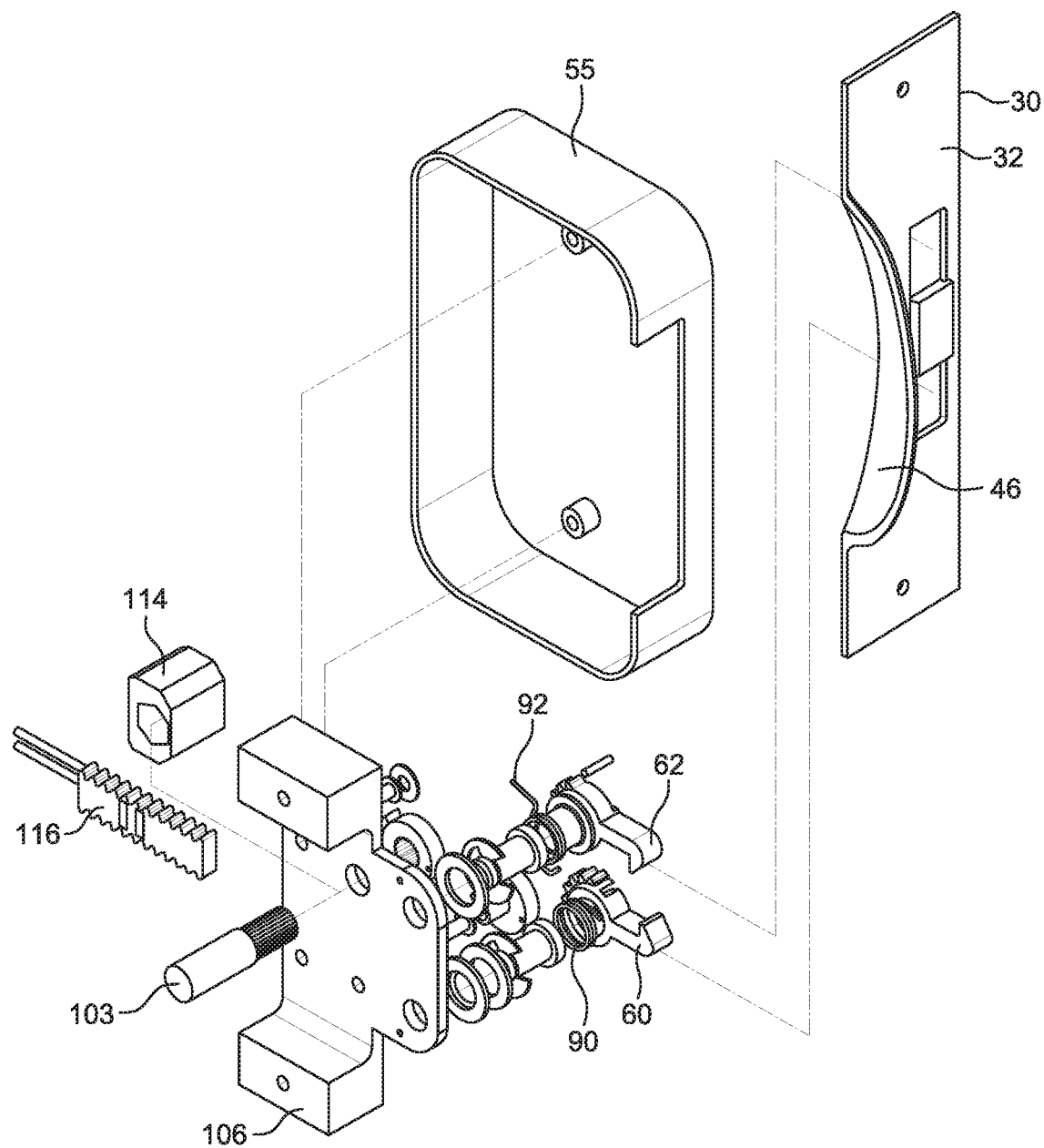
FIG. 13 is an exploded view of the latch and catch assembly according to the embodiment including a push button mechanism for latch release.

The storage bin 20 is shown in FIG. 8 with a latch mechanism 100 according to another embodiment. As shown in FIGS. 9 and 10, the latch mechanism 100 has a user-actuatable pin 102 that can linearly actuated to disengage the latch mechanism 100 from the catch, permitting the door 24 to open. FIG. 9 shows the pin 102 in an extended position, corresponding to a latched or closed condition of the latch mechanism 100. FIG. 11 shows the pin 102 in an un-extended position, corresponding to an unlatched or open condition of the latch mechanism 100. A terminal end of the pin 102, referenced as a button 103, extends outward from the base plate 104 of the latch mechanism 100. The button 103 can be pressed from the extended position to unlatch the mechanism 100, causing the hooks 60 and 62 to pivot to the disengagement positions.

In the extended position of the pin 102, the button 103 may extend from a hole in the wall 26 of the bin 20 (FIG. 8). Upon pressing, the button 103 can be positioned flush with the wall 26 to open the latch mechanism 100. In another example, the button 103 may be flush or sunken relative to the exterior surface of the wall 26 in the extended position of the pin 102, such that pressing the button 103 inward from the exterior surface opens the latch mechanism 100.

The following descriptions of the latch mechanism 100 rely on the above descriptions of the latch mechanism 50 with regard to features that are similar in the two mechanisms, while drawing particular attention to features that are different. Like reference numbers are used in the following for features sufficiently described above.

As shown in FIGS. 9-11, the latch mechanism 100 of the second illustrated embodiment includes the base plate 104 upon which the first hook 60 and second hook 62 are pivotally mounted on the first axle 56 and second axle 58 respectively. Laterally arranged spacers 106 extend from the base plate 104 for mounting the latch mechanism 100 to the interior of the wall of the latchable storage bin 20. The protective housing 55 is attached to the base plate 104 opposite the spacers 106, encasing the moving components from exposure in the interior of the storage bin 20.

The latch mechanism 100 of FIGS. 9-11 includes the user-actuatable pin 102 for extending the gear rail 116 from the rearward-most position of FIG. 10, at which the hooks 60 and 62 are in the engagement positions and the latch mechanism 100 is in a latched condition, to the forwardmost position of FIG. 11, at which the hooks 60 and 62 are in the disengagement positions and the latch mechanism 100 is in an unlatched condition. In the latch mechanism 100, a partially toothed first gear 110 is pivotally mounted on the base plate 104 rearward of the first hook 60, and a partially toothed second gear 112 is pivotally mounted on the base plate 104 rearward of the second hook 62. The gears 110 and 112 cooperate with the toothed portions of the first and second hooks 60 and 62 to guide and move the gear rail 116 linearly.

The gear teeth of the gear rail 116 are distributed along both lateral sides sufficiently to engage both the relatively forward first and second hooks 60 and 62 and relatively rearward first and second gears 110 and 112. The keeper 80 and gear rail 116 of the latch mechanism 100 of FIGS. 9-11 may have different dimensions relative to the keeper 80 and gear rail 72 of the latch mechanism 50 of FIGS. 4-6 while providing similar functionalities. The gear rail 72 of the latch mechanism 50 of FIGS. 4-7 is user actuated by the handle 52 and lever 94, whereas the gear rail 116 of the latch mechanism 100 of FIGS. 9-11 is user actuated by the pin 102 and first gear 110.

The second gear 112 is pivotally mounted on a fixed axle. The first gear 110 is slidably mounted on the pin 102. In the latched condition (FIG. 9), the pin 102 extends from the latch mechanism 100 through an internally threaded bore of a fixed barrel 114. For example, the fixed barrel 114 may be mounted in the hole in the wall 26 of the storage bin 20 through which the pin 102 extends. The first gear 110 and pin 102 are shown without the fixed barrel in FIG. 10 for illustration purposes. When the button 103 is pressed by user action, the pin 102 moves linearly toward the base plate 104 and rotates by engagement with the internally threaded bore of the fixed barrel 114. This rotates the first gear 110, retracting the gear rail 116, which rotates the hooks 60 and 62 to their disengagement positions (FIG. 11) against the biasing force of the torsion springs. The forward end 118 of the gear rail 116 pushes the catch 30 away from the latch mechanism 100, opening the door 22 of the storage bin 20 in the in-use example of FIG. 8. In such action, the torsion springs are overcome to permit the latch mechanism 100 to assume the unlatched condition, and the keeper 80 maintains the latch mechanism 100 in the unlatched condition by engaging the ridges 120 on the outer face of the gear rail 116 once the forward most position of the gear rail 116 is reached.

When the gear rail 116 is returned rearward to the rearward-most position (FIG. 10), for example as the catch 30 approaches the latch mechanism 100 upon closure of the door 24, the gear rail 116 is pressed rearward and automatically causes the hooks 60 and 62 to pivot toward their engagement positions. The gear rail 116 also counter rotates the first gear 110, thereby re-extending the pin 102 by way of its engagement with the internally threaded bore of the fixed barrel 114.

In the latch mechanism 50 and the latch mechanism 100, a sensor may be included to detect the status of the mechanism with regard to engagement with the catch 30 for example, and closure of the door 24. The sensor may alert crew members for example in an aircraft as to the status of the latch mechanism and door for safety and security purposes.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A latch and catch assembly, comprising:
a catch attachable to a first structure; and
a latch mechanism attachable to a second structure, the latch mechanism and the catch cooperating to secure the first structure relative to the second structure, the latch mechanism comprising:
  i) a first hook and a second hook mounted for pivoting movement between an engagement position for engaging with the catch and a disengagement position for disengaging from the catch;
  ii) a translating gear rail positioned between the first and second hooks, the translating gear rail engaged on opposing lateral sides thereof with the respective first and second hooks;
  iii) an actuator mechanism operable for driving movement of the translating gear rail to drive simultaneous pivoting movement of the first and second hooks in opposite directions to drive ends of the first and second hooks apart toward their disengagement position; and
  iv) a base plate and a keeper attached to the base plate, the keeper maintaining persistent contact with the translating gear rail by a spring force of a clip, and the translating gear rail having ridges on an outer face thereof within which the clip engages to maintain the first and second hooks in their disengagement position.

2. The latch and catch assembly of claim 1, wherein each of the first and second hooks are rotatably mounted on a shaft coupled to the base plate, and wherein each of the first and second hooks are rotationally-biased in a direction toward their engagement position by a torsion spring mounted on the shaft and engaging the respective one of the first and second hooks.

3. The latch and catch assembly of claim 2, wherein the translating gear rail is movably positioned on the base plate between the first and second hooks and has longitudinally-spaced gear teeth formed on the opposing lateral sides thereof engaging gear teeth on mounting rings of the first and second hooks, the gear teeth of the translating gear rail engaging the gear teeth of the mounting rings such that linear movement of the translating gear rail is coordinated with pivoting movement of the first and second hooks.

4. The latch and catch assembly of claim 3, wherein movement of the translating gear rail in a first direction drives pivoting movement of the first and second hooks toward their disengagement position, and movement of the translating gear assembly in a second direction opposite the first direction drives the first and second hooks toward their engagement position.

5. The latch and catch assembly of claim 1, wherein each of the first and second hooks includes a pivotally-attached end and a hooked end, and wherein the hooked ends are positioned spaced apart and facing each other when the first and second hooks are in their engagement position.

6. The latch and catch assembly of claim 1, wherein the catch comprises a strike plate positioned between first and second spaced openings, the translating gear rail adapted to contact the strike plate to move the translating gear rail away from the catch to drive the first and second hooks toward their engagement position, and the first and second hooks adapted to be received in the respective first and second openings to engage the first and second hooks with the catch in their engagement position.

7. The latch and catch assembly of claim 1, wherein the latch mechanism is mountable on an interior wall of a storage bin and the catch is mountable on a door pivotally attached to the storage bin, whereby, when the first and second hooks engage the catch in their engagement position, the door is latched in a closed condition.

8. The latch and catch assembly of claim 1, wherein the actuator mechanism comprises a user-actuatable pin for moving the translating gear rail toward the catch, thereby pivoting the first and second hooks toward their disengagement position.

9. The latch and catch assembly of claim 1, wherein the actuator mechanism comprises an actuatable handle, wherein pivoting the handle causes the translating gear rail to move toward the catch.

10. A cabinet assembly, comprising:
a cabinet having a latch mechanism mounted on an inner wall of the cabinet; and
a door pivotally-attached to the cabinet and having a catch mounted on the door;
wherein a portion of the latch mechanism engages with the catch to hold the door in a closed condition; and
wherein the latch mechanism comprises:
i) a base plate;
ii) a first hook and a second hook mounted on shafts of the base plate for pivoting movement between an engagement position for engaging with the catch and a disengagement position for disengaging from the catch;
iii) a translating gear rail positioned between the first and second hooks, the translating pear rail engaged on opposing lateral sides thereof with the respective first and second hooks to coordinate translating gear rail movement with pivoting movement of the first and second hooks;
iv) an actuator mechanism operable for driving movement of the translating gear rail to drive simultaneous pivoting movement of the first and second hooks toward their disengagement position; and
v) a keeper attached to the base plate, the keeper maintaining persistent contact with the translating gear rail by a spring force of a clip, and the translating gear rail having ridges on an outer face thereof within which the clip engages to maintain the first and second hooks in their disengagement position.

11. The cabinet assembly of claim 10, wherein each of the first and second hooks are rotationally-biased in a direction toward their engagement position by a torsion spring mounted on the shaft and engaging the respective one of the first and second hooks.

12. The cabinet assembly of claim 10, wherein the translating gear rail is movably positioned on the base plate between the first and second hooks and has longitudinally-spaced gear teeth formed on the opposing lateral sides thereof engaging gear teeth on mounting rings of the first and second hooks, the gear teeth of the translating gear rail engaging the gear teeth of the mounting rings such that linear movement of the translating gear rail is coordinated with pivoting movement of the first and second hooks.

13. The cabinet assembly of claim 10, wherein movement of the translating gear rail in a first direction drives pivoting movement of the first and second hooks toward their disengagement position, and movement of the translating gear assembly in a second direction opposite the first direction drives the first and second hooks toward their engagement position.

14. The cabinet assembly of claim 10, wherein each of the first and second hooks includes a pivotally-attached end and a hooked end, and wherein the hooked ends are ramped such that engagement of the hooked ends with the catch deflects the first and second hooks toward their disengagement position.

15. The cabinet assembly of claim 10, wherein the catch comprises a strike plate positioned between spaced first and second spaced openings, the translating gear rail adapted to contact the strike plate to move the translating gear rail away from the catch to drive the first and second hooks toward their engagement position, and the first and second hooks adapted to be received in the respective first and second openings to engage the first and second hooks with the catch in their engagement position.

16. The cabinet assembly of claim 10, wherein the actuator mechanism comprises a user-actuatable pin for moving the translating gear rail toward the catch, thereby pivoting the first and second hooks toward their disengagement position.

17. The cabinet assembly of claim 10, wherein the actuator mechanism comprises an actuatable handle, wherein pivoting the handle causes the translating gear rail to move toward the catch thereby pushing the catch away from the latch mechanism and opening the door.

* * * * *